(12) United States Patent
Mikami

(10) Patent No.: US 11,886,025 B2
(45) Date of Patent: Jan. 30, 2024

(54) LIGHT-RECEIVING MODULE

(71) Applicant: Mitsubishi Electric Corporation, Tokyo (JP)

(72) Inventor: Yohei Mikami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 429 days.

(21) Appl. No.: 17/258,045

(22) PCT Filed: Nov. 16, 2018

(86) PCT No.: PCT/JP2018/042461
§ 371 (c)(1),
(2) Date: Jan. 5, 2021

(87) PCT Pub. No.: WO2020/100283
PCT Pub. Date: May 22, 2020

(65) Prior Publication Data
US 2021/0286141 A1    Sep. 16, 2021

(51) Int. Cl.
*G02B 6/42* (2006.01)
(52) U.S. Cl.
CPC ........... *G02B 6/4266* (2013.01); *G02B 6/421* (2013.01); *G02B 6/4206* (2013.01)
(58) Field of Classification Search
CPC .... G02B 6/4218; G02B 6/421; G02B 6/4202; G02B 6/4203; G02B 6/4204;
(Continued)

(56) References Cited

U.S. PATENT DOCUMENTS 6,040,934 A    3/2000 Ogusu et al.
6,179,483 B1 *  1/2001 Kanazawa ........... G02B 6/4207
                                                        385/66
(Continued)

FOREIGN PATENT DOCUMENTS

CN        1959452 A     5/2007
CN       104880780 A    9/2015
(Continued)

OTHER PUBLICATIONS

An Office Action mailed by China National Intellectual Property Administration dated Jan. 5, 2022, which corresponds to Chinese Patent Application No. 201880095958.X and is related to U.S. Appl. No. 17/258,045 with English language translation.

(Continued)

*Primary Examiner* — John R Lee
(74) *Attorney, Agent, or Firm* — Studebaker & Brackett PC

(57) ABSTRACT

A receptacle (6) includes an optical fiber stub (7). A lens (5) includes an incident-side curved surface (9), an emission-side curved surface (10), and a barrel (11) provided between the incident-side curved surface (9) and the emission-side curved surface (10). A receptacle holder (8) holds the receptacle (6) so that the lens (5) and the optical fiber stub (7) are not in contact but separated from each other. When light out from the optical fiber stub (7) enters the lens (5) through the incident-side curved surface (9), the light is condensed inside the lens (5) and then spreads again, and the light out from the emission-side curved surface (10) is condensed onto a light-receiving surface of the light-receiving device (2).

19 Claims, 4 Drawing Sheets

(58) Field of Classification Search
CPC ...... G02B 6/4206; G02B 6/42; G02B 6/4201; G02B 6/4249; G02B 6/425; G02B 6/4256; G02B 6/4266
See application file for complete search history.

(56) References Cited

U.S. PATENT DOCUMENTS

| | | | |
|---|---|---|---|
| 6,788,472 | B1 | 9/2004 | Iwasaki |
| 7,235,774 | B2* | 6/2007 | Ishigami .............. G02B 6/4214 385/33 |
| 7,322,752 | B2* | 1/2008 | Endou .................. G02B 6/4206 385/94 |
| 8,118,498 | B2* | 2/2012 | Sasada .................. G02B 6/421 385/94 |
| 8,380,075 | B2* | 2/2013 | Sakigawa ............ G02B 6/4246 398/128 |
| 10,386,225 | B2* | 8/2019 | Mikami ................. G01J 1/0411 |
| 10,613,280 | B2* | 4/2020 | Kurashima .......... G02B 6/4292 |
| 10,833,775 | B1* | 11/2020 | Wang .................. G02B 6/4277 |
| 11,152,342 | B2* | 10/2021 | Maekawa ......... H01L 31/0200 |
| 11,181,690 | B2* | 11/2021 | Fondeur ............. G02B 6/12019 |
| 2001/0026660 | A1 | 10/2001 | Asakura et al. |
| 2001/0048794 | A1* | 12/2001 | Nakaya ................ G02B 6/4204 385/93 |
| 2006/0249661 | A1* | 11/2006 | Ishigami .............. G02B 6/4214 250/216 |
| 2009/0263082 | A1* | 10/2009 | Sasada .................. G02B 6/421 385/39 |
| 2013/0161497 | A1* | 6/2013 | Sasada ................. G02B 6/4206 250/227.24 |
| 2015/0241636 | A1 | 8/2015 | Ohata et al. |
| 2018/0106667 | A1 | 4/2018 | Mikami |
| 2018/0177404 | A1 | 6/2018 | Liu |
| 2019/0011649 | A1* | 1/2019 | Kurashima .......... G02B 6/4292 |
| 2019/0196122 | A1* | 6/2019 | Omori ................. G02B 6/4292 |
| 2021/0098523 | A1* | 4/2021 | Maekawa .......... H01L 27/1469 |
| 2021/0286141 | A1* | 9/2021 | Mikami .............. G02B 6/4206 |

FOREIGN PATENT DOCUMENTS

| | | |
|---|---|---|
| CN | 107946376 A | 4/2018 |
| EP | 370663 A2 | 5/1990 |
| JP | S55-006354 A | 1/1980 |
| JP | S63-082957 U | 5/1988 |
| JP | H02-244012 A | 9/1990 |
| JP | h05-1089 Y2 | 1/1993 |
| JP | H06-138346 A | 5/1994 |
| JP | H08-190005 A | 7/1996 |
| JP | H10-010373 A | 1/1998 |
| JP | H11-266000 A | 9/1999 |
| JP | 2004-118223 A | 4/2004 |
| JP | 2004-322362 A | 11/2004 |
| JP | 2007-127797 A | 5/2007 |
| JP | 2010-117513 A | 5/2010 |
| JP | 2018-063350 A | 4/2018 |

OTHER PUBLICATIONS

An Office Action; "Notice of Reasons for Refusal", mailed by the Japanese Patent Office dated Apr. 5, 2022, which corresponds to Japanese Patent Application No. 2020-556553 and is related to U.S. Appl. No. 17/258,045; with English language translation.

International Search Report; Written Opinion; and Notification of Transmittal of the International Search Report and the Written Opinion of the International Searching Authority, or the Declaration issued in PCT/JP2018/042461; dated Feb. 5, 2019.

An Office Action mailed by the Korean Intellectual Property Office dated May 11, 2023, which corresponds to Korean Patent Application No. 10-2021-7004633 and is related to U.S. Appl. No. 17/258,045; with English language translation.

* cited by examiner

LIGHT-RECEIVING MODULE

FIELD

The present disclosure relates to a light-receiving module.

BACKGROUND

A light-receiving module is used in optical communication. In the light-receiving module, a lens condenses light from an optical fiber onto a light-receiving surface of a light-receiving device (refer to Patent Literature 1, for example).

CITATION LIST

Patent Literature

[Patent Literature 1] Japanese Patent Laid-Open No. 10-010373

SUMMARY

Technical Problem

In a conventional light-receiving module, when strong light is input, an excessive amount of photocurrent flows to a light-receiving device, and the light-receiving device fails due to heat generation, which has been a problem.

The present invention is intended to solve the problem as described above and provide a light-receiving module capable of preventing a light-receiving device from failing even when strong light is input.

Solution to Problem

A light-receiving module according to the present disclosure includes: a light-receiving device; a receptacle including an optical fiber stub; a lens including an incident-side curved surface, an emission-side curved surface, and a barrel provided between the incident-side curved surface and the emission-side curved surface; and a receptacle holder holding the receptacle so that the lens and the optical fiber stub are not in contact but separated from each other, wherein when light out from the optical fiber stub enters the lens through the incident-side curved surface, the light is condensed inside the lens and then spreads again, and the light out from the emission-side curved surface is condensed onto a light-receiving surface of the light-receiving device.

Advantageous Effects of Invention

In the present disclosure, the optical fiber stub is held being not in contact with but separated from the lens, and curved surfaces are provided on incident and emission sides, respectively, of the lens. When light out from the optical fiber stub enters the lens through the incident-side curved surface, the light is condensed inside the lens and spreads, and the light out from the emission-side curved surface is condensed onto a light-receiving surface of the light-receiving device. However, when strong light is input, the vicinity of a condensation point inside the lens is heated and the refractive index varies, which shifts the focal position of light emitted from the lens. Accordingly, a beam incident on the light-receiving surface of the light-receiving device spreads, and the density of current flowing through the light-receiving device decreases, which can prevent failure of the light-receiving device.

DESCRIPTION OF EMBODIMENTS

A light-receiving module according to the embodiments of the present disclosure will be described with reference to the drawings. The same components will be denoted by the same symbols, and the repeated description thereof may be omitted.

Embodiment 1

Figure 1:
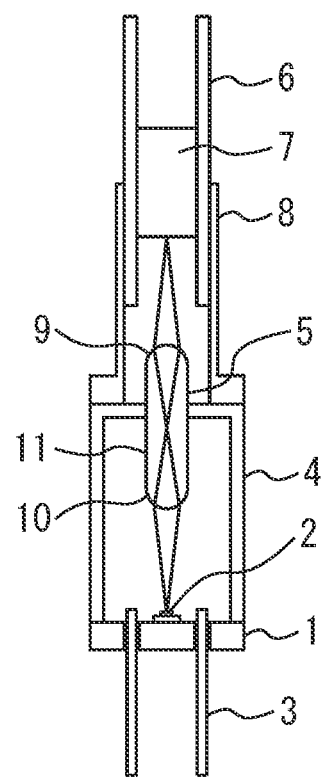
FIG. 1 is a cross-sectional view illustrating a light-receiving module according to Embodiment 1.

FIG. 1 is a cross-sectional view illustrating a light-receiving module according to Embodiment 1. A light-receiving device 2 is provided on a stem 1. A lead 3 penetrates through the stem 1 and is connected with the light-receiving device 2. A lens barrel 4 covers the light-receiving device 2. A lens 5 is attached to the lens barrel 4. A receptacle 6 includes an optical fiber stub 7. A receptacle holder 8 holds the receptacle 6 so that the lens 5 and the optical fiber stub 7 are not in contact but separated from each other. The receptacle 6 and the receptacle holder 8 are fixed to each other by piercing YAG welding or fillet YAG welding from a side surface. The receptacle holder 8 and the lens barrel 4 are fixed to each other by YAG welding at their butting part from the side surface.

Figure 2:
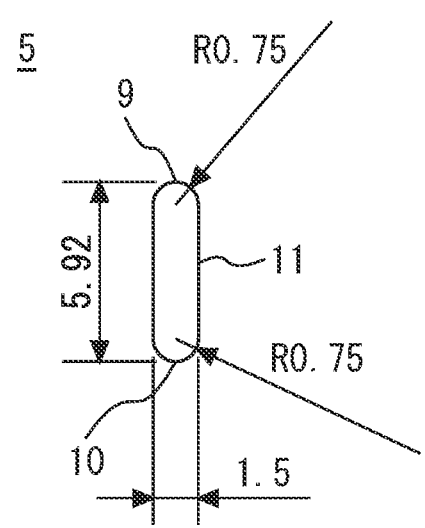
FIG. 2 is a cross-sectional view illustrating a lens according to Embodiment 1.

FIG. 2 is a cross-sectional view illustrating a lens according to Embodiment 1. The lens 5 includes an incident-side curved surface 9, an emission-side curved surface 10, and a barrel 11 provided between the incident-side curved surface 9 and the emission-side curved surface 10. The incident-side curved surface 9 and the emission-side curved surface 10 are hemispheres having a curvature radius of 0.75 mm, but the present invention is not limited thereto, and the surfaces may have aspherical surface shapes. The radius of the barrel 11 is 0.75 mm. The total length of the lens 5 is 5.92 mm. The lens 5 is made of a material having a refractive index of 1.5, such as BK-7. Antireflection films (not illustrated) are provided to the incident-side curved surface 9 and the emission-side curved surface 10.

In the present embodiment, the optical fiber stub 7 is held being not in contact with but separated from the lens 5, and curved surfaces are provided on incident and emission sides, respectively, of the lens 5. When light out from the optical fiber stub 7 enters the lens 5 through the incident-side curved surface 9, the light is condensed inside the lens 5 and then spreads again, and the light out from the emission-side curved surface 10 is condensed onto a light-receiving surface of the light-receiving device 2. However, when strong light is input, the vicinity of a condensation point inside the lens 5 is heated and the refractive index varies, which shifts the focal position of light emitted from the lens 5. Accordingly, a beam incident on the light-receiving surface of the light-receiving device 2 spreads, and the density of current flowing through the light-receiving device 2 decreases, which can prevent failure of the light-receiving device 2.

To facilitate heat generation by the lens 5, the material of the lens 5 may be doped with, for example, metal ions that absorb light. The optical fiber stub 7 has a perpendicularly polished emission end face. When reflected and returned light from the emission end face of the optical fiber stub 7 causes problem, an antireflection film may be provided on the emission end face of the optical fiber stub 7.

Embodiment 2

Figure 3:
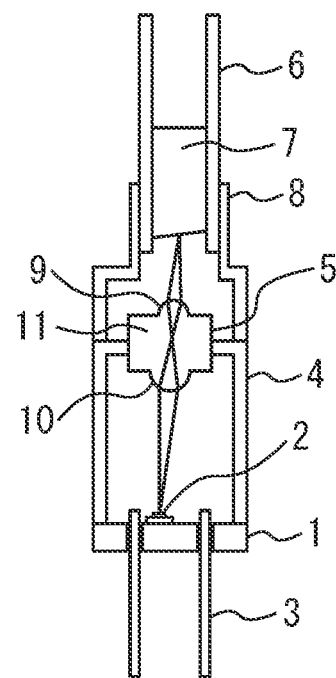
FIG. 3 is a cross-sectional view illustrating a light-receiving module according to Embodiment 2.
Figure 4:
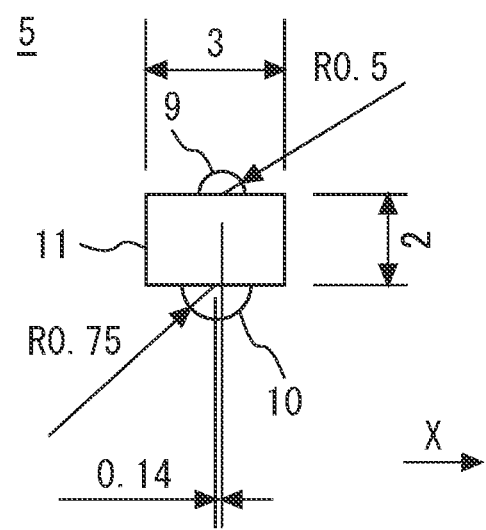
FIG. 4 is a cross-sectional view illustrating a lens according to Embodiment 2.

FIG. 3 is a cross-sectional view illustrating a light-receiving module according to Embodiment 2. FIG. 4 is a cross-sectional view illustrating a lens according to Embodiment 2. The incident-side curved surface 9 is a hemisphere having a curvature radius of 0.5 mm. The emission-side curved surface 10 is a hemisphere having a curvature radius of 0.75 mm. The barrel 11 has a radius of 1.5 mm and a total length of 2 mm. The lens 5 is made of a material having a refractive index of 1.8, such as TAF3. The curvature center of the emission-side curved surface 10 is offset from the curvature center of the incident-side curved surface 9 by −0.14 mm in an x direction. The x direction is orthogonal to an optical axis.

In the present embodiment, the curvature radii of the incident-side curved surface 9 and the emission-side curved surface 10 are different and the curvature centers thereof are shifted from each other. The emission end face of the optical fiber stub 7 is polished at 8° to prevent reflected and returned light from the emission end face of the optical fiber stub 7. In this case, light is obliquely incident on the lens 5. The curvature centers of the incident-side curved surface 9 and the emission-side curved surface 10 are offset from each other in accordance with the angle of the incident light. The curvature center of the emission-side curved surface 10 coincides with the center of the barrel 11. Thus, a beam is condensed onto the surface of the light-receiving device even when the light is obliquely incident. In this manner, effects same as those of Embodiment 1 can be obtained even when light is obliquely incident.

Embodiment 3

Figure 5:
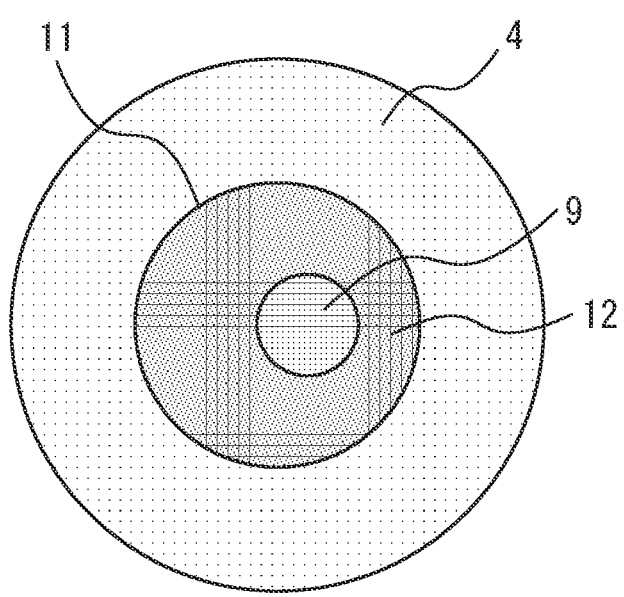
FIG. 5 is a top view illustrating a lens according to Embodiment 3.

FIG. 5 is a top view illustrating a lens according to Embodiment 3. When the radius of the barrel 11 is larger than the radius of the incident-side curved surface 9 in plan view from a light incident side, part of an incident-side end face of the lens 5 exists outside the incident-side curved surface 9. When light enters this part, the light-receiving device 2 senses the light having passed through the lens 5 but not through the incident-side curved surface 9, and thus the optical fiber stub 7 is potentially fixed at a false position. Thus, in the present embodiment, light-shielding coating 12 of a material such as chromium is provided outside the incident-side curved surface 9 on the incident-side end face of the lens 5. Accordingly, only light having entered through the incident-side curved surface 9 is emitted from the lens 5. Thus, when the light-receiving module is assembled, the optical axis of the optical fiber stub 7 is adjusted in a smaller range, which makes it easier to adjust the optical axis. Other configurations and effects are same as those of Embodiment 2.

Embodiment 4

Figure 6:
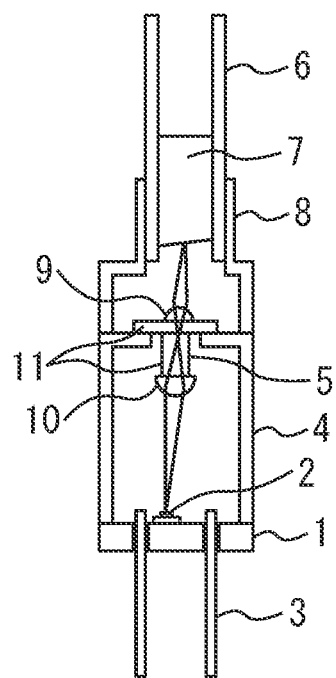
FIG. 6 is a cross-sectional view illustrating a light-receiving module according to Embodiment 4.
Figure 7:
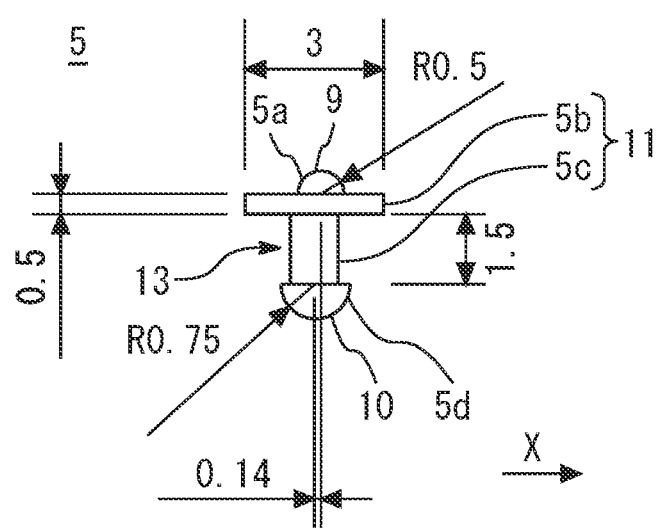
FIG. 7 is a cross-sectional view illustrating a lens according to Embodiment 4.

FIG. 6 is a cross-sectional view illustrating a light-receiving module according to Embodiment 4. FIG. 7 is a cross-sectional view illustrating a lens according to Embodiment 4. The lens 5 is divided into four components 5a, 5b, 5c, and 5d. The component 5a is a hemisphere having a radius of 0.5 mm and corresponds to the incident-side curved surface 9. The component 5b is a cylinder having a radius of 1.5 mm and a thickness of 0.5 mm. The component 5c is a cylinder having a radius of 0.5 mm and a thickness of 1.5 mm. The components 5b and 5c correspond to the barrel 11. The component 5d is a hemisphere having a radius of 0.75 mm and corresponds to the emission-side curved surface 10. The center of the component 5d is offset from the center of the component 5a by −0.14 mm in the x direction. The center of the component 5d coincides with the center of the components 5b and 5c.

In this manner, the incident-side curved surface 9, the emission-side curved surface 10, and the barrel 11 of the lens 5 are divided into components different from one another. These components are integrally bonded to each other by a bonding agent having a refractive index equal to that of the components. This simplifies the shape of each component and makes it easier to produce the lens 5. The shape of the component 5b in which part of the lens 5 protrudes to sides makes it easier to attach the lens 5 to the lens barrel 4.

Each component is made of a material having a refractive index of 1.8, such as TAF3, and the refractive indexes of the components at room temperature are equal. However, the change amounts of the refractive indexes of the components 5b and 5c of the barrel 11 with temperature are larger than those of the component 5a of the incident-side curved surface 9 and the component 5d of the emission-side curved surface 10. Thus, when strong light is input, the refractive index of the barrel 11 largely varies, and a beam incident on the light-receiving surface of the light-receiving device 2 is likely to spread, which can prevent failure of the light-receiving device 2.

In addition, a constriction 13 is provided at a side surface of the barrel 11 in which light is condensed. Accordingly, the volume of the lens 5 decreases and thermal energy necessary for heating the lens 5 decreases, which makes refractive index variation more likely to occur at the lens 5. Moreover, heat is vertically transferred from the condensation point of light, which makes refractive index variation more likely to occur at the incident-side curved surface 9 and the emission-side curved surface 10 as well. Accordingly, a beam incident on the light-receiving surface of the light-receiving device 2 spreads, which can prevent failure of the light-receiving device 2. Other configurations and effects are same as those of Embodiment 2.

REFERENCE SIGNS LIST 2 light-receiving device; 5a,5b,5c,5d component; 5 lens; 6 receptacle; 7 optical fiber stub; 8 receptacle holder; 9 incident-side curved surface; 10 emission-side curved surface; 11 barrel; 12 light-shielding coating; 13 constriction

The invention claimed is:
1. A light-receiving module comprising:
a light-receiving device;
a receptacle including an optical fiber stub;

a lens including an incident-side curved surface, an emission-side curved surface, and a cylindrical portion provided between the incident-side curved surface and the emission-side curved surface; and a receptacle holder holding the receptacle so that the lens and the optical fiber stub are not in contact but separated from each other, wherein when a single beam of light out from the optical fiber stub enters the lens through the incident-side curved surface, the single beam of light is condensed inside the lens and then spreads again, and the single beam of light out from the emission-side curved surface is condensed onto a light-receiving surface of the light-receiving device.

2. The light-receiving module according to claim 1, wherein curvature radii of the incident-side curved surface and the emission-side curved surface are different, and curvature centers of the incident-side curved surface and the emission-side curved surface are offset from each other in a direction orthogonal to an optical axis.

3. The light-receiving module according to claim 2, further comprising light-shielding coating provided outside the incident-side curved surface on an incident-side end face of the lens.

4. The light-receiving module according to claim 1, wherein the incident-side curved surface, the emission-side curved surface, and the cylindrical portion of the lens are divided into components different from one another, and the components are integrally bonded to each other by a bonding agent having a refractive index equal to that of the components.

5. The light-receiving module according to claim 4, wherein a change amount of a refractive index of the component of the cylindrical portion with temperature is larger than those of the component of the incident-side curved surface and the component of the emission-side curved surface.

6. The light-receiving module according to claim 1, wherein a constriction is provided at a side surface of the cylindrical portion.

7. The light-receiving module according to claim 2, wherein the incident-side curved surface, the emission-side curved surface, and the cylindrical portion of the lens are divided into components different from one another, and the components are integrally bonded to each other by a bonding agent having a refractive index equal to that of the components.

8. The light-receiving module according to claim 7, wherein a change amount of a refractive index of the component of the cylindrical portion with temperature is larger than those of the component of the incident-side curved surface and the component of the emission-side curved surface.

9. The light-receiving module according to claim 3, wherein the incident-side curved surface, the emission-side curved surface, and the cylindrical portion of the lens are divided into components different from one another, and the components are integrally bonded to each other by a bonding agent having a refractive index equal to that of the components.

10. The light-receiving module according to claim 9, wherein a change amount of a refractive index of the component of the cylindrical portion with temperature is larger than those of the component of the incident-side curved surface and the component of the emission-side curved surface.

11. The light-receiving module according to claim 2, wherein a constriction is provided at a side surface of the cylindrical portion.

12. The light-receiving module according to claim 3, wherein a constriction is provided at a side surface of the cylindrical portion.

13. The light-receiving module according to claim 4, wherein a constriction is provided at a side surface of the cylindrical portion.

14. The light-receiving module according to claim 5, wherein a constriction is provided at a side surface of the cylindrical portion.

15. The light-receiving module according to claim 7, wherein a constriction is provided at a side surface of the cylindrical portion.

16. The light-receiving module according to claim 8, wherein a constriction is provided at a side surface of the cylindrical portion.

17. The light-receiving module according to claim 9, wherein a constriction is provided at a side surface of the cylindrical portion.

18. The light-receiving module according to claim 10, wherein a constriction is provided at a side surface of the cylindrical portion.

19. The light-receiving module according to claim 1, wherein the lens comprises a material doped with metal ions that absorb light.

* * * * *